J. J. GRIFFIN.
APPARATUS FOR STONING AND SPLITTING FRUIT.
APPLICATION FILED JUNE 30, 1919.

1,334,449.

Patented Mar. 23, 1920.

Inventor.
James Joseph Griffin
By
Attorney.

J. J. GRIFFIN.
APPARATUS FOR STONING AND SPLITTING FRUIT.
APPLICATION FILED JUNE 30, 1919.
1,334,449.
Patented Mar. 23, 1920.
2 SHEETS—SHEET 2.
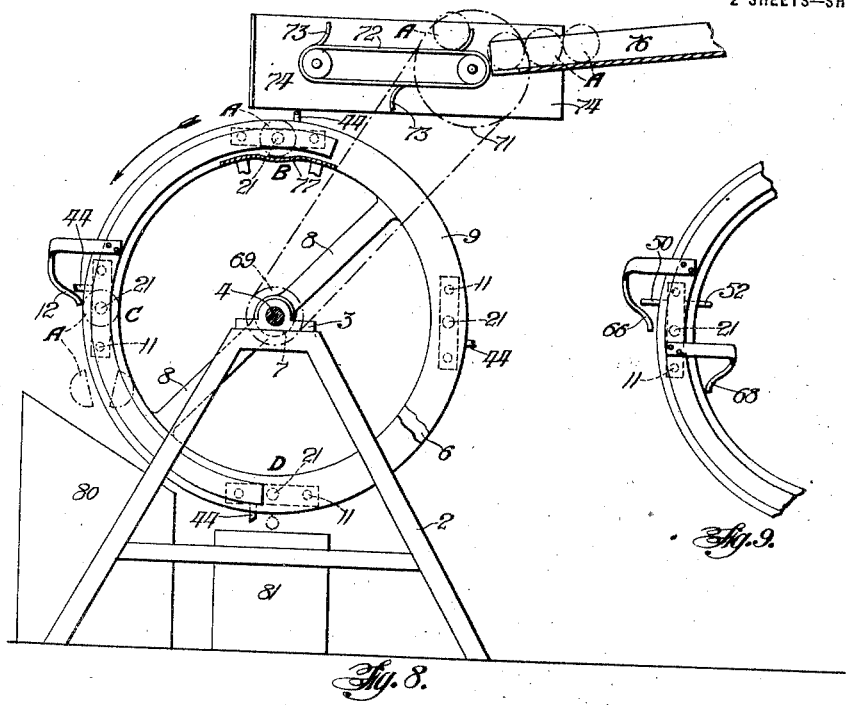
Fig. 8.
Fig. 9.
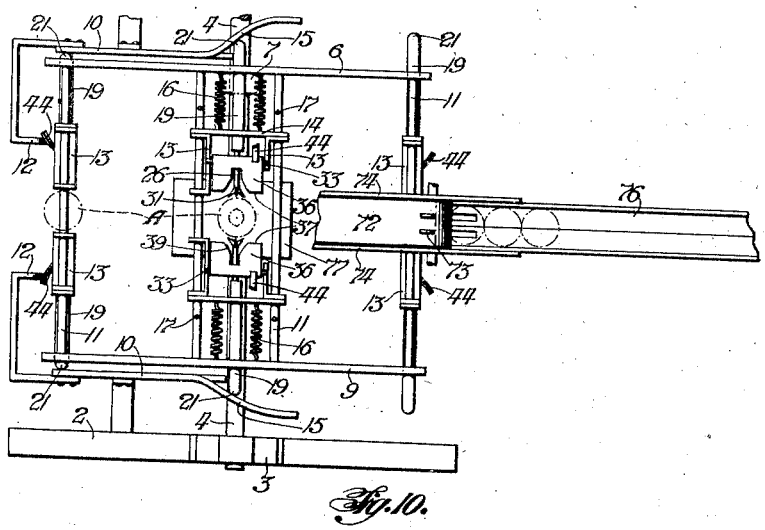
Fig. 10.
Fig. 11.
Inventor:
James Joseph Griffin
By
Attorney.

UNITED STATES PATENT OFFICE.

JAMES J. GRIFFIN, OF MELBOURNE, VICTORIA, AUSTRALIA.

APPARATUS FOR STONING AND SPLITTING FRUIT.

1,334,449.

Specification of Letters Patent.  Patented Mar. 23, 1920.

Application filed June 30, 1919. Serial No. 307,662.

*To all whom it may concern:*

Be it known that I, JAMES JOSEPH GRIFFIN, a citizen of the United States of America, and a resident of the city of Prahran, a suburb of the city of Melbourne, in the county of Bourke, State of Victoria, Commonwealth of Australia, (whose post-office address is 1 Garden street, South Yarra, in the said city of Prahran,) have invented certain new and useful Improved Apparatus for Stoning and Splitting Fruit, of which the following is a specification.

The object of this invention is to provide a new or improved machine or apparatus for removing the stones from stone fruit such as apricots, peaches, plums and the like, each piece of fruit being at the same time divided into two halves suitable for jam making, preserving or other purposes. It is at present the usual custom to remove the stone from such fruit by hand and also in some cases by mechanism including what are known as pitting appliances which are passed through the fruit and push out the stone therefrom. By the present invention the objectionable handling of fruit during stoning operations is avoided, a much larger output is obtainable in a given time, labor is reduced to a minimum and the fruit is not in any way injured in regard to its suitability for the purposes indicated.

The invention resides primarily in the use of opposed gripping devices which are adapted to penetrate the flesh of a piece of fruit and firmly grip the stone while the flesh is removed therefrom. This latter operation is performed by means of oppositely disposed knives or dividers which enter the flesh of the fruit and separate it in two halves from the stone while the latter is held by the grippers above-mentioned.

The gripping devices and knives referred to form the basic features of the invention and it is to be distinctly understood that their particular construction and arrangement and the means employed for operating them may be varied considerably according to requirements or conditions of installation. The grippers and knives may be embodied in a comparatively small machine and operated by hand or foot or in cases where a larger and more rapid output is required, such as in factories or the like, they may be incorporated in series in a larger automatic machine and suitable means provided to convey the fruit separately from a bulk reservoir or the like to the grippers and knives.

Referring to the drawings which form part of this specification:—

Figure 1 shows a set of grippers and knives or dividers and other parts associated therewith in position to receive a piece of fruit. In this particular embodiment the knives are arranged in two opposite hinged pairs. In dotted lines the knives and grippers are shown closed upon the fruit.

Fig. 8 is a diagrammatic side view of one form of automatic machine in which the invention may be embodied. Four sets of the knives and grippers seen in Fig. 1 are here shown, but any desired number may be employed.

Fig. 9 shows how the construction seen in Fig. 8 may be modified to operate the single opposed knives or dividers seen in Figs. 4 and 5.

Fig. 10 is a plan of Fig. 8, parts being removed for convenience of illustration.

Fig. 11 is a detail view of a further modification in which the knives or dividers are arranged in pairs, but only one knife of each pair is provided with a cutting edge.

Figure 1:
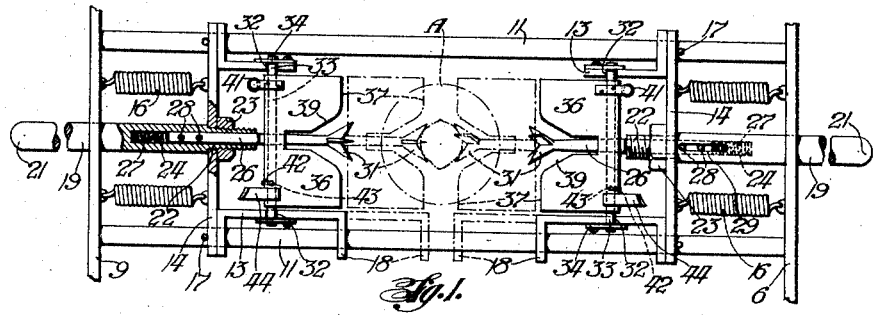

In the example shown in Fig. 8 which shows the invention embodied in an automatic machine, the numeral 2 indicates a stand having bearings 3 which support an axle 4.

Mounted upon this axle is a rotary frame comprising a first side cheek or ring 6 having a boss 7 keyed to the axle 4. Between this boss and the ring 6 radiate arms 8. A second side cheek or ring 9 is completely open at its middle and is fixed to the first cheek or ring 6 by lateral guide bars 11 of any suitable number.

Located outside each of the cheeks 6 and 9 is a cam pathway 10 having an inclined portion 15. Secured to the cam pathway or to any other suitable fixture may be tappets 12.

Mounted upon the guide bars 11 as seen clearly in Fig. 1 are two sliding frames which comprise bearing pieces 13 and bridge pieces 14. These sliding frames are normally drawn outwardly or apart by tension springs 16 which are attached at their outer ends to the side cheeks 6 and 9. Stops 17 limit the outward movement of the sliding frames while their inward movement is limited by the meeting of the stops 18, which are formed by extensions of the sliding frames.

Passing through holes in the side cheeks 6 and 9 are the outer ends of sliding gripper tubes 19, the outer extremities of which are rounded as at 21 to engage the cam pathways 10. The inner end of each gripper tube 19 is reduced as at 22, this reduced portion passing through a central hole in the bridge piece 14 and being threaded to receive a nut 23 whereby the sliding frames are fixed to the tubes 19.

Formed within each of said tubes 19 is a central passageway 24 to accommodate a gripper rod 26, the outer end of which is pressed upon by a compression spring 27. Stop pins 28 project through slots 29 in the gripper tubes and limit the movement of the rods 26 in relation to said tubes. Fixed to the inner end of each of the gripper rods 26 is a claw 31 formed preferably of a series of sharpened blades as shown. These opposite claws are adapted to penetrate the flesh of the fruit and grip the sides of the stone.

Figure 2:
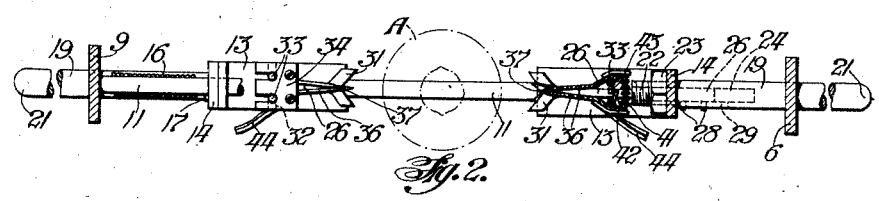
Fig. 2 is a part sectional plan of Fig. 1, the knives and grippers being in their outward position.
Figure 3:
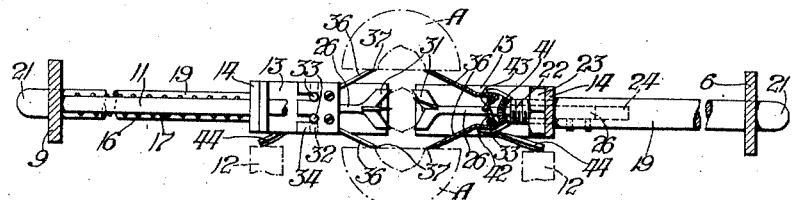
Fig. 3 is a part sectional plan of the embodiment seen in Figs. 1 and 2, showing the double knives hinged apart to separate the fruit from the stone.

Accommodated by gullets 32 in the bearing pieces 13 of the sliding frames are hinge pins 33 which are retained within the bearing pieces 13 by removable cover plates 34. As seen in Figs. 1 to 3, two of these hinge pins may be supported by each sliding frame in which case a hinged knife 36 is secured to each of said hinge pins thus providing two opposed pairs of hinged knives as shown in Fig. 2. The knives 36 are provided with inner or cutting edges 37 although as shown in Fig. 11 it will be seen that it is not essential that both should be provided with cutting edges, one of the knives in this instance being back-set from its fellow and accommodated by a step or shoulder 38 therein, so that the single knife edge does the cutting while the other blade merely serves to open out and divide the fruit.

Each of the knife blades is provided with a gullet or recess 39 which is adapted to clear the stone when the knives are closed upon the fruit. The knives in Figs. 1, 2 and 3 are held normally closed or together as in Fig. 2 by a closing spring 41. Projecting from one of the hinge pins 33 of each sliding frame is a first spur 42 which is adapted to engage a second spur 43 on the adjacent hinge pin whereby when one of the knives is opened outwardly as seen in Fig. 3 by the operation of an actuating arm 44, the spur 42 will by engagement with the adjacent spur 43 cause the other knife of the pair to be swung open against the action of the spring 41 as clearly seen in Fig. 3.

Instead of the knives being mounted in pairs as above described, single opposed hinged knives 46 may be employed. These knives may be fixed to hinge pins 47 which pass centrally through slots 48 in the gripper rods 26 so that the latter are free to move in and out against the springs 27. In this embodiment the knives are provided with clearance openings 49 (Fig. 6) so that they may hinge in either direction as shown in dotted lines in Fig. 4 without fouling the gripper rods 26. To hold the knives 46 normally in their proper parallel or opposed position to enter the fruit, tension springs 51 are secured at one end to the outer edges of the knives and at their other ends to the bridge pieces 14. Thus when the knives are moved in either direction by the operation of first and second actuating arms 50 and 52, the springs 51 will be extended and immediately the actuating arms are released. said springs will cause the knives to swing back to their original central position.

Figure 5:
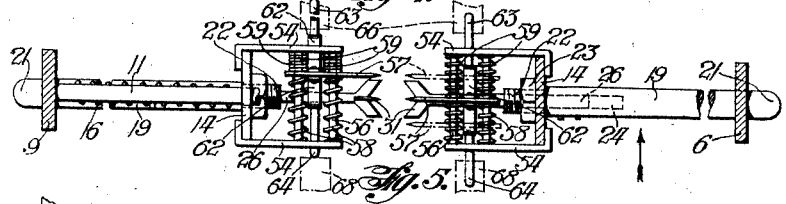
Fig. 5 shows a further modification in which the knives instead of being hinged are adapted to slide in a straight or parallel line to separate the halves of the fruit from the stone.
Figures 6, 7:
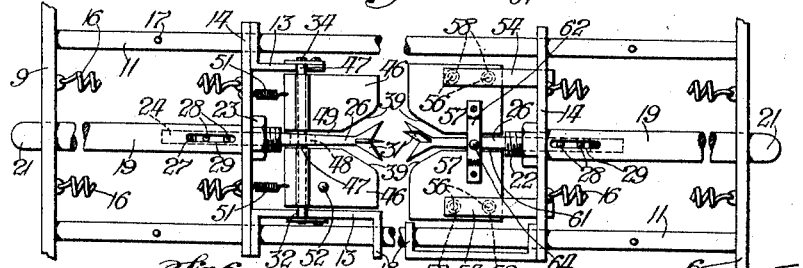
Fig. 6 is a view looking in the direction of the arrow seen in Fig. 4, only one half of the apparatus being shown.
Fig. 7 is a view looking in the direction of the arrow seen in Fig. 5, only one half of the apparatus being shown.

As shown in Figs. 5 and 7 the knives instead of being hinged may be adapted to slide from side to side to remove the halves of the fruit from the stone held by the claws. In this instance the sliding frames may be provided with opposite members 54 between which extend guide pins 56. Mounted to slide upon these pins are sliding knives or dividers 57 which are normally held directly opposite each other and in a central position by opposed compression springs 58 and 59. In this embodiment the knives are also provided with clearance openings 61, the two portions of each knife thus formed being united by bridge plates 62 which are bent outwardly or arched sufficiently to enable the knives to move in either direction to push off the halves of the fruit from the stone without the bridge plates 62 coming into contact with the gripper rods 26. Projecting from the bridge plates 62 are first and second actuating arms 63 and 64.

Figure 4:
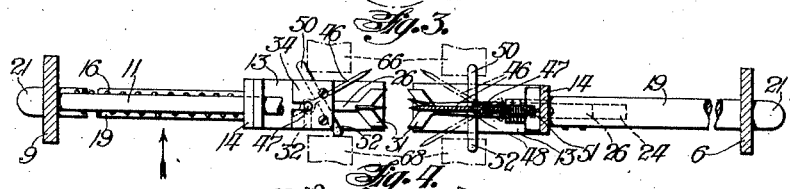
Fig. 4 illustrates a modification in which single opposed hinged knives or dividers are employed.

With the embodiments seen in Figs. 4 and 5, first tappets 66, and second tappets 68 are employed as in Fig. 9, these tappets being adapted to alternately engage the first actuating arms 50 or 63 and the second actuating arms 52 or 64 respectively.

The fruit may be fed automatically into the machine shown in Fig. 8 by securing on the axle 4 a first sprocket wheel 69 which drives in proper timed relationship a second sprocket wheel 71 operating a conveyer 72, the fruit being carried by conveyer fingers 73 between side plates 74 from a V sectioned feed chute 76 along which the fruit is fed to the machine. It is deposited by the fingers 73 upon a stationary fruit support 77 where it is seized by the grippers. Other means may obviously be employed for feeding the fruit to the grippers, or this feeding may be performed by hand.

The apparatus shown in Fig. 8 operates as follows:—The fruit A is fed separately to the grippers at the point marked B where it is dropped or deposited on the supporting plate 77 by the conveyer. At this point the grippers are drawn sufficiently far apart by the springs 16 to receive the fruit between the claws 31, but as the outer ends of the gripper tubes 19 now engage the inclined portions 15 of the cam pathways as in Fig. 10, the grippers and knives move inwardly penetrating the flesh of the fruit and the claws grip the sides of the fruit stone. The fruit is then carried onwardly by the grippers and another piece of fruit is dropped onto the plate 77 as a succeeding pair of grippers come opposite it, the drive of the axle 4 and the conveyer 72 being relatively timed for this purpose. As the grippers reach the point C the knife actuating arms 44 engage the tappets 12 thereby causing the knives to be swung apart as seen in Fig. 3. This causes the fruit, which is bisected by the knives as they more inwardly with the grippers, to be pushed off the stone as seen in Fig. 3. The knives then automatically return to their original closed position as in Fig. 2, under the influence of the springs 41 immediately the tappets 12 have been passed. The two halves of the fruit may fall into a receptacle 80 or into a delivery chute suitably placed to receive them. Immediately the outer ends of the members 19 leave the cam pathways 11 at D the grippers and knives automatically move outwardly from each other under the influence of the tension springs 16 until the sliding frames encounter the limit stops 17. The stone is thus released by the grippers and may drop into a receptacle 81 near the ends of the cam pathways 11. The grippers and knives continue to move onwardly toward the feeding point B where they again come together upon another piece of fruit and the operation repeats itself. It will be evident that as many pairs of grippers and associated knives as desired may be arranged around the cheeks 6 and 9 or in any other suitable manner so that a considerable quantity of fruit may be treated in a minimum of time. It will be seen furthermore that as the grippers move inwardly and the claws 31 seize the stone, the compression springs 27 permit the grippers to yield thereby avoiding any shock or jar when the stone is encountered and permitting the grippers to accommodate themselves to different sized stones. The gullets 39 in the knives enable the inner edges of the latter to move close together within the fruit without coming into contact with the stone.

If either of the embodiments seen in Figs. 4 and 5 is used, the grippers and knives move inwardly in the same manner to penetrate the fruit. The knife actuating arms 50 or 63 are then first engaged by the first tappets 66 which cause the knives to throw off one half of the fruit from the stone. The actuating arms 52 or 64 are then engaged by the second tappets 68 causing the other half of the fruit to be pushed off the stone by the knives moving in the opposite direction. The stone is then released by the grippers as they pass the cam pathways at D in the manner before described.

Under ordinary circumstances where the fruit is required for jam making or the like it may be fed to the grippers and knives in any position, as it does not in such cases matter in which direction the fruit is split. In some instances, however, as where the fruit is required for preserving, it may be necessary to place the fruit between the grippers by hand, so that it is split in the required direction. It is not essential that the knives should move inwardly into the fruit simultaneously with the grippers as said knives may move in after the stone has been seized by the grippers and independently of the latter. Furthermore they may be arranged to enter the fruit in a plane at right angles to the grippers instead of in the same plane as shown in the drawings.

It is to be distinctly understood that the particular apparatus described and illustrated in detail is merely explanatory and is not intended to limit the invention which may obviously be applied in various ways. Any suitable mechanical contrivances may thus be employed to actuate the grippers and knives to hold the fruit at the stone and remove the flesh while the stone is thus held as described, such means being controlled either automatically or by hand or foot according to requirements and the circumstances under which the apparatus is used.

Furthermore, the precise construction of the grippers and knives and other parts may be altered or modified considerably without departing from the nature, spirit and scope of the invention.

Having now described my invention what I claim as new and desire to secure by Letters Patent is:—

1. In fruit stoning apparatus, a gripping device comprising an elongated tubular gripper guide and a gripper rod mounted to slide in the bore of said tube or guide, a claw at one end of said rod and cushioning means interposed in said bore between the inner end of the latter and said rod for the purpose set forth.

2. In fruit stoning apparatus, guides, sliding frames mounted on said guides and adapted to move to and from each other, opposed gripping devices carried by said frames and adapted to move therewith and springs adapted to normally draw said frames apart.

3. In fruit stoning and splitting apparatus, guides, sliding frames mounted on said guides, opposed grippers carried by said frames and adapted to move to and from each other therewith, knives or dividers mounted on said sliding frames and means for holding said knives normally in proper opposed position to enter the fruit.

4. In fruit stoning and splitting apparatus, a rotary frame, guide rods carried by said frame, sliding frames mounted on said guide rods and adapted to move to and from each other, springs adapted to normally draw said frames apart, opposed gripping devices carried by said frames and opposed knives or dividers coöperating with said gripping devices for the purpose set forth.

5. In fruit stoning and splitting apparatus, a rotary frame, guide rods carried by said frame, sliding frames mounted on said guide rods and adapted to move to and from each other, sliding gripper tubes fixed to said sliding frames, gripper rods yieldingly mounted in said gripper tubes, claws carried on the inner ends of said gripper rods, opposed knives or dividers carried by said sliding frames, means for normally holding said knives in proper opposed position to enter the fruit and means for normally holding the grippers and knives apart to receive the fruit.

6. In fruit stoning apparatus, the combination of guides, sliding frames mounted on the guides for movement toward and from each other, opposed gripper tubes fixed to said frames to move therewith, gripper rods slidably fitting in said tubes, cushioning devices for permitting yielding movement of said rods in relation to said tubes, and means for normally holding said frames in separated relation to permit the introduction of the fruit between the rods.

7. In fruit stoning apparatus, the combination of guides, sliding frames mounted on the guides for movement toward and from each other, opposed gripping devices fixed to said frames to move therewith, means to normally draw said frames apart, cam means engageable with the ends of the gripping devices to move the same and the frames toward each other, and means for producing relative traveling movement between the gripping devices and the cam means.

8. In fruit stoning apparatus, the combination of opposed gripping devices comprising sliding gripper tubes, gripper rods slidably fitting in said tubes, cushioning devices for permitting yielding movement of said rods in relation to said tubes, means to normally hold the gripping devices apart to receive the fruit, and cam means engageable with the ends of said tubes to force the gripping devices toward each other.

9. In fruit stoning apparatus, the combination of guides, sliding frames mounted on the guides for movement toward and from each other, opposed gripper tubes fixed to said frames to move therewith, gripper rods slidably fitting in said tubes, cushioning devices for permitting yielding movement of said rods in relation to said tubes, means for normally holding said frames in separated relation to permit the introduction of the fruit between the rods, and means operative upon the ends of the tubes to force the latter and their rods toward each other.

10. In fruit stoning apparatus, the combination of guides, sliding frames mounted on the guides for movement toward and from each other, opposed gripper tubes fixed to said frames to move therewith, gripper rods slidably fitting in said tubes, cushioning devices for permitting yielding movement of said rods in relation to said tubes, means for normally holding said frames in separated relation to permit the introduction of the fruit between the rods, cam means operative upon the ends of the tubes to force the latter and their rods toward each other, and means for producing relative traveling movement between said cam means and said tubes.

11. In fruit stoning apparatus, the combination of guide rods, a pair of sliding frames mounted on said guide rods for movement toward and from each other, said frames being disposed transversely of said guide rods and engaged therewith at opposite ends, opposed gripping devices connected to said frames to move with them, each gripping device including an element having a projecting end, means for normally maintaining said frames in separated relation, and means operative upon said projecting ends to force said gripping device and frames toward each other.

12. In fruit stoning and splitting apparatus, the combination of guides, sliding frames mounted on said guides for movement toward and from each other, opposed grippers connected to said frames to move therewith, opposed knives also carried by said frames to move with them, means for normally holding said frames in separated relation, means for forcing said frames toward each other and means for moving the knives relatively to their respective frames during the movement of the latter.

13. In apparatus of the character described, the combination of a rotary frame, guides carried thereby, sliding frames mounted on the guides to move toward or from each other, opposed devices carried by the frames for operation upon a fruit introduced between them, means operative upon said sliding frames to move them in one direction, and stationary cam means operative upon said devices during the movement of the rotary frame to move them in the opposite direction.

14. In apparatus of the character described, the combination of a rotary frame, guides carried thereby, sliding frames mounted on the guides to move toward or from each other, opposed devices carried by the frames for operation upon a fruit introduced between them, means operative upon said sliding frames to move them in one direction, and stationary cam tracks disposed at opposite sides of the rotary frame in position to engage said devices during the movement of the rotary frame to force them in the opposite direction.

15. In apparatus of the character described, the combination of a rotary frame, guides carried thereby, sliding frames mounted on the guides to move toward or from each other, opposed devices carried by the frames for operation upon a fruit introduced between them, spring connections between the rotary frame and the sliding frames to move the former toward each other, and cam tracks disposed at opposite sides of the rotary frame in position to engage the ends of said devices and force them toward each other.

16. In fruit stoning apparatus, the combination of opposed gripping devices adapted to penetrate opposite sides of the fruit and grip the stone, opposed dividers carried by the gripping devices and adapted to move inwardly into the fruit in the same plane as said gripping devices, and means for actuating the dividers to strip the fruit completely off the stone and the gripping devices while the latter hold the stone.

17. In fruit stoning apparatus, the combination of opposed gripping devices adapted to penetrate opposite sides of the fruit and grip the stone, cushioning means associated with the gripping devices to permit them to yield on encountering the stone, and means adapted to bisect the fruit and strip off the two halves thereof from the stone and the gripping devices.

18. In fruit stoning apparatus, the combination of opposed gripping devices adapted to penetrate opposite sides of the fruit and grip the stone, cushioning means associated with the gripping devices to permit them to yield on encountering the stone, and means adapted to bisect the fruit in the plane of the gripping devices and to strip the two halves thereof from the stone and the gripping devices while the latter hold the stone.

19. In fruit stoning apparatus, the combination of opposed gripping devices adapted to penetrate opposite sides of the fruit and grip the stone, cushioning means associated with the gripping devices to permit them to yield on encountering the stone, opposed dividers adapted to bisect the fruit and separate the two halves thereof from the stone while the latter is held by the gripping devices, and means adapted to normally hold said dividers in proper opposed position to enter the fruit.

In testimony whereof I affix my signature.

J. J. GRIFFIN.

Witness:
CECIL W. LA CLESTINE.